United States Patent
Ranzau

(10) Patent No.: US 6,802,513 B2
(45) Date of Patent: Oct. 12, 2004

(54) SEALING SECTION FOR A LAMP

(75) Inventor: Heiko Ranzau, Bockenem (DE)

(73) Assignee: Meteor Gummiwerke K.H. Bädje GmbH & Co., Bockenem (DE)

( * ) Notice: Subject to any disclaimer, the term of this patent is extended or adjusted under 35 U.S.C. 154(b) by 5 days.

(21) Appl. No.: 10/110,828

(22) PCT Filed: May 7, 2001

(86) PCT No.: PCT/EP01/07665

§ 371 (c)(1),
(2), (4) Date: Apr. 17, 2002

(87) PCT Pub. No.: WO02/21046

PCT Pub. Date: Mar. 14, 2002

(65) Prior Publication Data

US 2002/0153674 A1 Oct. 24, 2002

(30) Foreign Application Priority Data

Sep. 6, 2000 (DE) .................................. 200 15 359 U

(51) Int. Cl.⁷ ............................................... F16J 15/02
(52) U.S. Cl. ...................... 277/641; 277/648; 277/652; 277/921
(58) Field of Search ............................... 277/641, 648, 277/650, 652, 654, 921

(56) References Cited

U.S. PATENT DOCUMENTS

| | | | | |
|---|---|---|---|---|
| 2,156,681 A | * | 5/1939 | Dewhirst et al. | 404/65 |
| 2,841,429 A | * | 7/1958 | McCuistion | 277/402 |
| 2,910,209 A | * | 10/1959 | Nelson | 220/378 |
| 3,095,619 A | * | 7/1963 | Peterson | 277/316 |
| 3,353,832 A | * | 11/1967 | Coulson | 277/591 |
| 3,367,693 A | * | 2/1968 | Weltman, Jr. | 52/731.7 |
| 4,113,268 A | * | 9/1978 | Simmons et al. | 277/641 |
| 4,192,520 A | * | 3/1980 | Hasegawa | 277/591 |
| 4,779,841 A | * | 10/1988 | Pupillo et al. | 251/306 |
| 4,792,180 A | * | 12/1988 | Jacobsen et al. | 296/210 |
| 5,513,674 A | * | 5/1996 | Frisch | 137/625.69 |
| 5,840,401 A | * | 11/1998 | Baesecke | 428/122 |
| 5,934,323 A | * | 8/1999 | Akimoto et al. | 137/625.69 |
| 5,964,979 A | * | 10/1999 | George et al. | 156/309.6 |
| 6,024,364 A | * | 2/2000 | Steffen | 277/645 |
| 6,485,030 B1 | * | 11/2002 | Hahn et al. | 277/645 |

FOREIGN PATENT DOCUMENTS

| | | | | |
|---|---|---|---|---|
| DE | 42 05 442 A | | 11/1992 | ............ F16J/15/10 |
| DE | 19748291 C1 | * | 10/1997 | |
| DE | 298 10 708 U1 | | 10/1998 | ............ F16J/15/10 |
| DE | 200 06 571 U1 | | 11/2000 | ............ F16J/15/10 |
| DE | 200 15 359 U1 | | 12/2000 | ............ F21V/31/00 |
| EP | 0 093 889 | | 11/1983 | ............ E06B/7/23 |
| FR | 2 231 531 | | 12/1974 | ............ B60J/1/02 |
| FR | 2 431 644 | | 2/1980 | ............ F16J/16/06 |
| JP | 11345505 A | * | 12/1999 | |
| JP | 207932 | * | 7/2000 | |
| JP | 2001-325813 | * | 11/2001 | |
| WO | WO 96/09483 | * | 3/1996 | |

\* cited by examiner

*Primary Examiner*—Alison Pickard
(74) *Attorney, Agent, or Firm*—Synnestvedt & Lechner LLP

(57) ABSTRACT

A sealing profile serves to seal a casing with respect to a cover disk of a lamp. The sealing profile is inserted into a groove on the casing having a groove base. The sealing profile has a seal section which includes lateral contact surfaces and interacts with the cover disk, a connection section and a foot section which is provided with lateral retaining lips and a retaining groove. The foot section has a strip which interacts sealingly with the groove base. When the sealing profile is in the relaxed state, the strip is disposed entirely within the retaining groove. When inserting the sealing profile into the groove the retaining lips are pivoted towards and pressed against the ribs of the lateral surfaces of the connection section, wherein the strip is pressed with a portion of its cross-sectional surface out of the retaining groove into contact with the base.

18 Claims, 3 Drawing Sheets

SEALING SECTION FOR A LAMP

BACKGROUND OF THE INVENTION

The invention relates to a sealing profile for sealing a casing with respect to a cover disk of a lamp. The lamp casing has a groove with a groove base for receiving the sealing profile.

In the case of a known sealing profile of this type (DE 298 10 708 U1, FIG. 2) greater protection against moisture seeping in at the bottom of the groove is already achieved by a sealing rib at the foot section.

DE 42 05 442 A1 discloses the placement of a planar base surface of a sealing profile with its entire surface against a complementary planar base surface in the base of a receiving groove. This arrangement is still not able to prevent moisture from seeping in.

SUMMARY OF THE INVENTION

The object of the invention is to prevent in a reliable manner moisture seeping in at the base of the lamp casing groove.

This object is achieved by virtue of a sealing profile extruded from at least one elastomer. The sealing profile comprises a seal section with lateral contact surfaces and a top contact surface which interacts with the cover disk. A connection section is attached to the seal section and has a reduced cross sectional surface relative to the seal section. A foot section is attached to the connection section, the foot section being provided with lateral retaining lips. The foot section comprises a strip which interacts in a sealing manner with the groove base. The strip prevents any penetration of moisture between the sealing profile and the base of the groove. A preferred area of application is the sealing of motor vehicle headlamps, where the cover disk can be made from synthetic material or glass and where it is imperative that the sealing effect is always guaranteed even during changes in temperature and vibrations.

Preferably, a retaining groove is positioned in the foot section of the sealing profile. The strip is held in the retaining groove in a reliable manner even when the sealing profile is in the relaxed state.

In order to guarantee the adhesive characteristics of the strip even until the sealing profile is inserted into the groove, the strip is covered by a cover sheet positioned along a surface region protruding out of the retaining groove.

Alternately, the strip may be disposed entirely within the retaining groove of the foot section when the sealing profile is in a relaxed state and not yet inserted into the lamp casing groove. The strip can be protected in this manner even without a cover sheet until it is inserted in the lamp casing groove.

This protective effect may be further enhanced by positioning the strip at a spaced disposition from an outer contour of the relaxed foot section.

The retaining groove is defined by inner ends of the retaining lips, thus, during the process of inserting the sealing profile into the groove the cross-sectional shape of the retaining groove can be changed in a convenient manner as desired.

When the sealing profile is in the relaxed state the lip inner ends form a gap between themselves. This facilitates the process of pressing the strip out of the retaining groove.

When inserting the sealing profile into the lamp casing groove the retaining lips can be pivoted towards and pressed against the lateral surfaces of the connection section. Thus it is possible to control in an extremely precise manner the process of pressing out the strip and to influence said process.

In order to promote the pressing-out effect each lateral surface is provided with a rib which protrudes outwards towards the associated retaining lip. This enhances the pressing-out effect, wherein the mass of the strip can spread out in the desired manner and to the desired extent between the groove base and the inserted sealing profile and a sufficiently permanent sealing effect can be ensured.

When the sealing profile is inserted into the groove the strip is disposed with a portion of its cross-sectional surface in the retaining groove of the foot section. Thus the strip is held in a particularly reliable manner in situ in the foot section.

The strip preferably comprises a permanently elastic permanently adhering sealing mass which may be made of, for example, a butyl-based elastomer. These features ensure a permanent, complete moisture seal at the base of the groove.

Making the sealing profile from an EPDM cellular rubber having a Shore A hardness of 15–25 provides a particularly favourable sealing effect on the one hand within the groove and on the other hand between the seal section and the cover disk.

BRIEF DESCRIPTION OF THE DRAWINGS

Further features and advantages of the invention are evident from the following description of the exemplified embodiments illustrated in the drawings, in which.

DETAILED DESCRIPTION OF THE PREFERRED EMBODIMENTS

Figure 1:
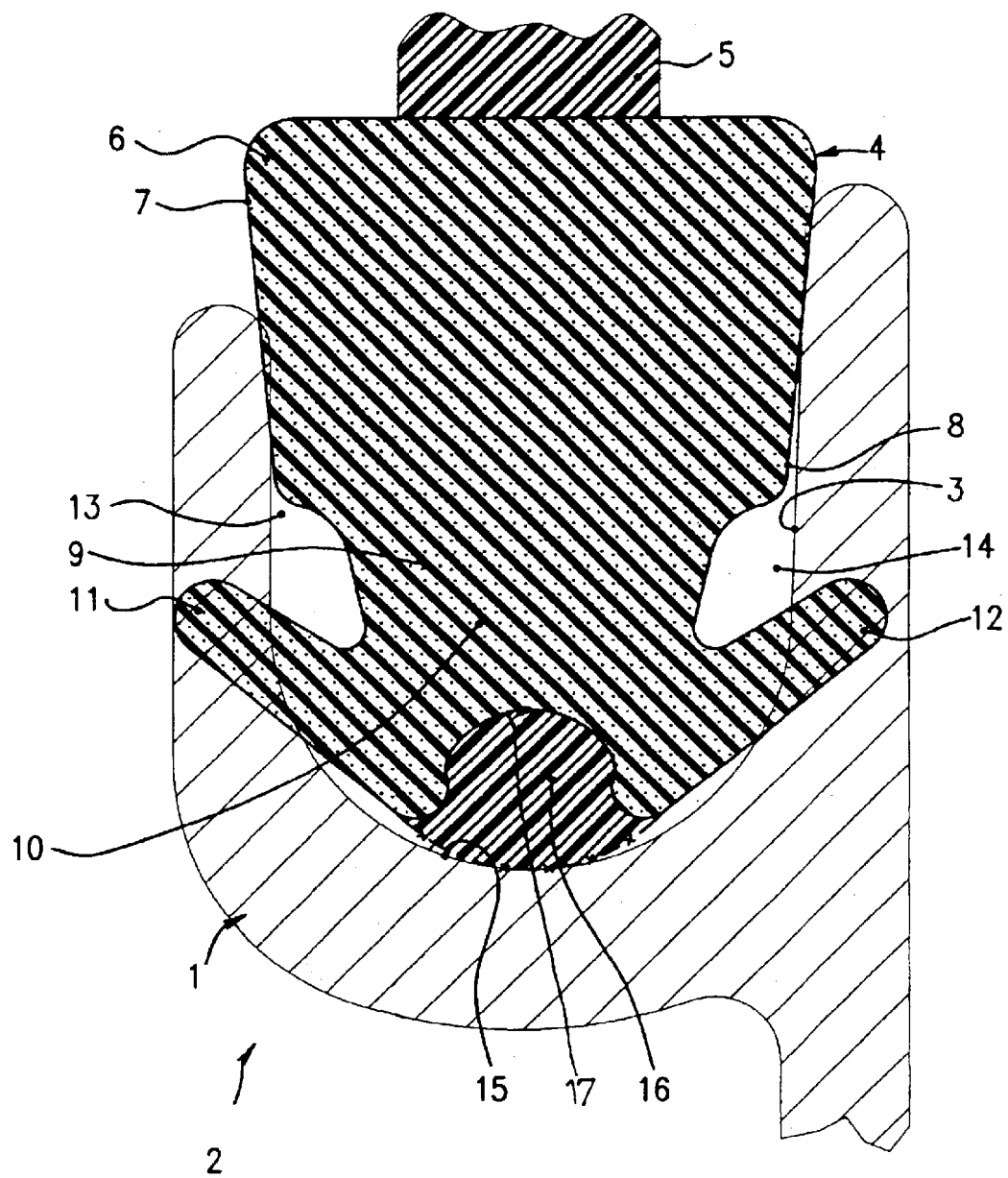
FIG. 1 is a cross-section through a sealing profile inserted into a groove of a casing, the sealing profile is however illustrated in the relaxed starting position.

FIG. 1 illustrates a part of a casing 1 of a lamp 2 of a motor vehicle. A sealing profile 4 is inserted in a groove 3 of the casing 1. The sealing profile 4 comprises a seal section 6 which has lateral contact surfaces 7 and 8 and interacts with a cover disk 5 of the lamp 2, the said contact surfaces lying against the lateral surfaces, the upper lateral surfaces in FIG. 1, of the groove 3 when the sealing profile 4 is inserted in the groove 3 prestressed in a transverse manner. The seal section 6 in FIG. 1 becomes in the downward direction a connection section 9 which has a reduced cross-sectional surface. The connection section 9 provides an elastic connection to a foot section 10 which is provided with opposing lateral retaining lips 11 and 12. When the sealing profile 4 is pressed into the groove 3 the retaining lips 11, 12 move inwards into the channels 13 and 14 between the groove 3 and the connection section 9. As a consequence on the one hand a good sealing effect of the sealing profile 4 to the side is achieved with respect to the lateral walls of the groove 3 and on the other hand a considerable amount of static friction is achieved which prevents the sealing profile 4 from falling out unintentionally from the groove 3, whilst the cover disk 5 is not fixed in position.

Figure 3:
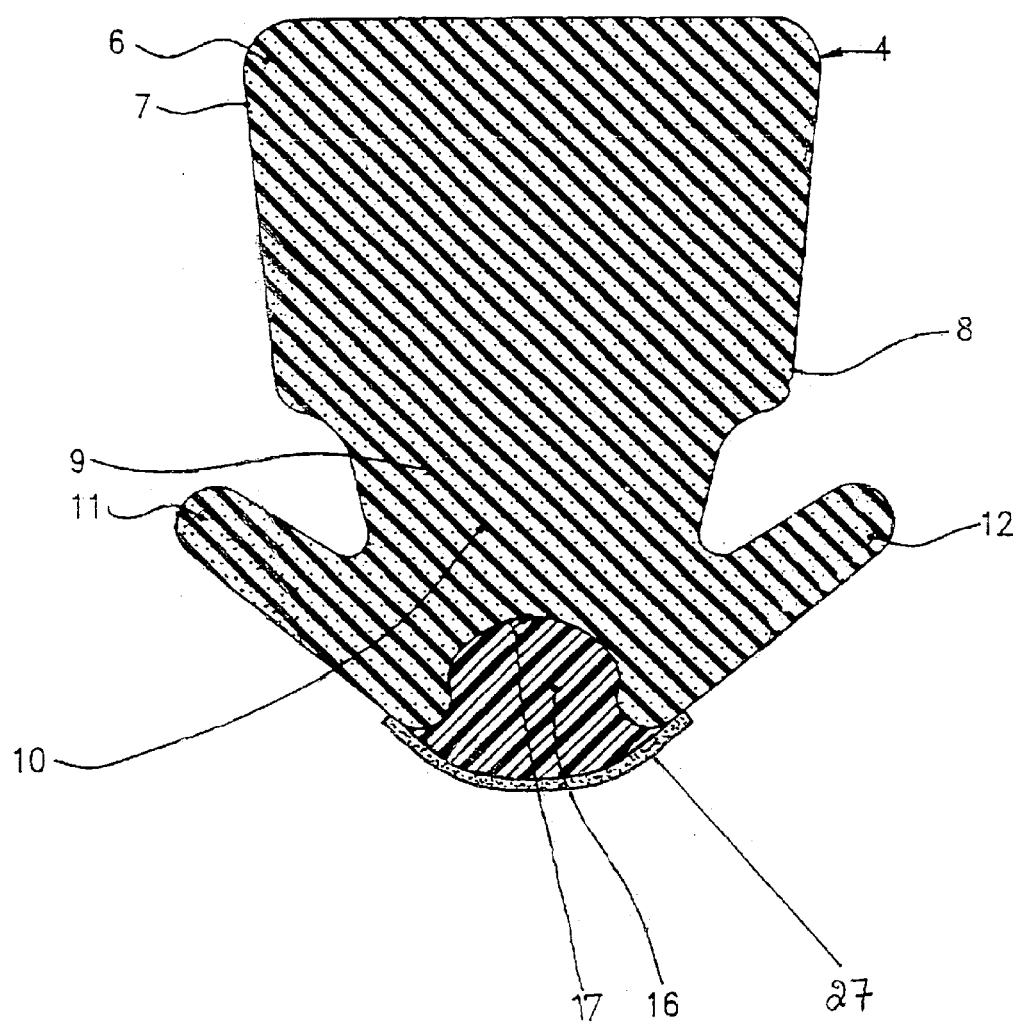
FIG. 3 is a cross-sectional view according to FIG. 1 illustrating a profile with a removable cover sheet.

The foot section 10 comprises facing a groove base 15 of the groove 3 a strip 16 which interacts in a sealing manner with the groove base 15. The strip 16 is disposed with a portion of its cross-sectional surface in a retaining groove 17 of the foot section 10. Preferably, the strip consists of a permanently adhering, butyl-based sealing mass. Until the sealing profile 4 is inserted into the groove 3, the surface portion of the strip 16 protruding out of the retaining groove 17 can be covered by a cover sheet 27 illustrated in FIG. 3.

As the sealing profile 4 is pressed into the groove 3 the strip 16 comes into contact with the groove base 15 and becomes connected in a permanently adhering and elastic manner to the groove base 15. In this manner moisture which has still penetrated between the seal section 6 and a lateral wall of the groove 3 is prevented from penetrating between the groove base 15 and the strip 16.

Figure 2:
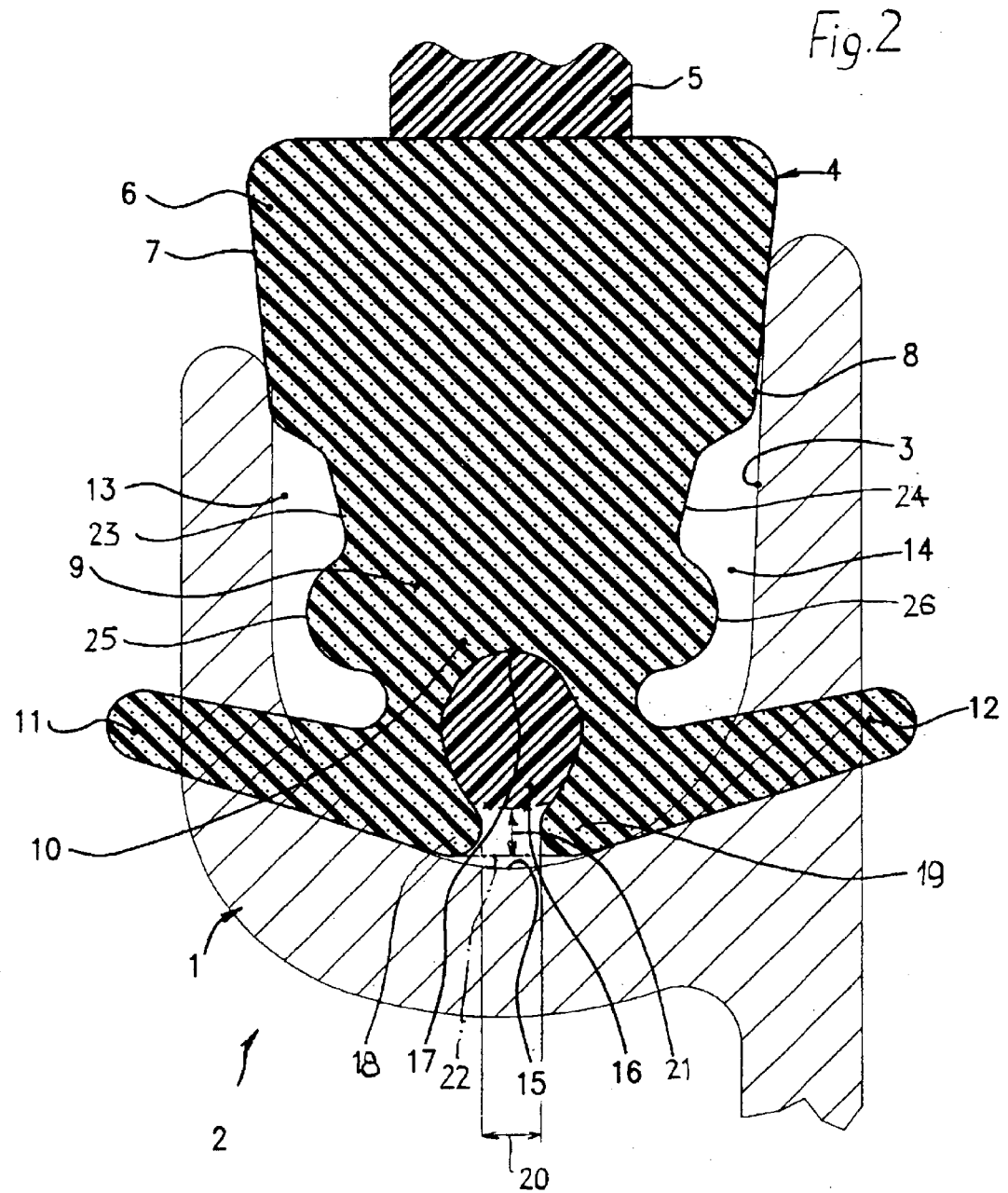
FIG. 2 is a cross-sectional view according to FIG. 1 through a different embodiment of the sealing profile.

Referring to FIG. 2, like parts are identified by like reference numerals in FIG. 1.

The exemplified embodiment according to FIG. 2 is similar to that in accordance with FIG. 1. However, the retaining lips 11, 12 in FIG. 2 in the illustrated relaxed position of the sealing profile 4 are somewhat longer and placed in a flatter manner than in FIG. 1. The retaining groove 17 is defined in FIG. 2 partially by inner ends 18 and 19 of the retaining lips 11, 12. In the case of a relaxed sealing profile, as illustrated in FIG. 2, the inner ends 18, 19 form a gap 20 between themselves.

In the case of a relaxed sealing profile 4 the strip 16 is disposed entirely within the retaining groove 17 and in fact at a spaced disposition 21 from the outer contour 22 of the foot section 10. Thus, a free, in FIG. 2 bottom, surface of the strip 16 therefore lies protected within the retaining groove 17. As a consequence, it is not necessary to cover this free surface by a cover sheet until the sealing profile 4 is inserted in the groove 3.

As the sealing profile 4 is inserted into the groove 3 the retaining lips 11, 12 are pivoted upwards, moved into the channels 13, 14 and pressed against the lateral surfaces 23 and 24 of the connection section 9. As a consequence, on the one hand the gap 20 is enlarged and on the other hand the strip 16 is pressed with one portion of its cross-sectional surface out of the retaining groove 17 into sealing contact with the groove base 15.

In order to promote this pressing-out effect, each lateral surface 23, 24 can be provided with a rib 25 and 26 respectively which protrudes outwards towards the associated retaining lip 11, 12. These 25, 26 are preferably disposed in the region of the, in FIG. 2 upper, end of the retaining groove 17, so that the pressing-out effect, starting from this upper end of the retaining groove 17, progresses to its lower end.

What is claimed is:

1. A sealing profile for providing a seal between a cover disk and a lamp casing, said lamp casing having a casing groove with a groove base for receiving said sealing profile, said sealing profile comprising:

a seal section having a first contact surface facing toward and engageable with said cover disk and a pair of outwardly facing lateral contact surfaces engageable with said casing groove;

a connection section extending from said seal section into said casing groove, said connection section having a reduced cross sectional area relative to said seal section;

a foot section positioned on said connection section and facing said groove base;

a retaining groove positioned within said foot section and facing said groove base;

a pair of retaining lips extending laterally outwardly from said foot section;

a strip mounted on said foot section and being sealingly engageable with said groove base, a portion of said strip being positioned within said retaining groove when said sealing profile is in a relaxed state and not yet positioned within said casing groove; and a removable cover sheet protruding outwardly from said retaining groove and covering said strip, said cover sheet being removable upon insertion of said sealing profile into said casing groove for allowing engagement of said strip with said groove base.

2. A sealing profile according to claim 1, wherein said strip is positioned entirely within said retaining groove when said sealing profile is in a relaxed state not positioned within and engaging said casing groove.

3. A sealing profile according to claim 2, wherein said strip is positioned within said retaining groove in spaced relation to an outer contour of said foot section when said sealing profile is in said relaxed state.

4. A sealing profile according to claim 3, wherein said retaining lips comprise ends facing one another which partially define said retaining groove.

5. A sealing profile according to claim 3, wherein said strip comprises a permanently elastic sealing mass.

6. A sealing profile according to claim 3, and comprising an EPDM cellular rubber having a Shore A hardness of 15 to 25.

7. A sealing profile according to claim 2, wherein said retaining lips comprise ends facing one another which partially define said retaining groove.

8. A sealing profile according to claim 7, wherein said ends of said retaining lips facing one another are separated from one another by a gap therebetween when said sealing profile is in said relaxed state.

9. A sealing profile according to claim 8, wherein said retaining lips are pivotable away from said strip into engagement with said connection section upon insertion of said sealing profile into said casing groove, said pivoting of said lips enlarging said gap between said retaining lip ends facing one another and forcing said strip to project outwardly from said retaining groove and into engagement with said groove base.

10. A sealing profile according to claim 9, wherein said connection section comprises outwardly facing lateral surfaces, each lateral surface having a rib extending outwardly therefrom, said retaining lips engaging said ribs when pivoting upon insertion of said sealing profile into said casing groove, said lips facilitating said forcing of said strip outwardly from said retaining groove.

11. A sealing profile according to claim 9, wherein said strip comprises a permanently adhering sealing mass.

12. A sealing profile according to claim 2, wherein a portion of said strip is positioned within said retaining groove when said sealing profile is inserted within said casing groove.

13. A sealing profile according to claim 1, wherein said portion of said strip is positioned within said retaining groove when said sealing profile is inserted within said casing groove.

14. A sealing profile according to claim 13, wherein said strip comprises a permanently elastic sealing mass.

15. A sealing profile according to claim 13, wherein said strip comprises a permanently adhering sealing mass.

16. A sealing profile according to claim 13, and comprising an EPDM cellular rubber having a Shore A hardness of 15 to 25.

17. A sealing profile according to claim 1, wherein said strip comprises a permanently adhering sealing mass.

18. A sealing profile according to claim 1, wherein said strip consists of a butyl-based sealing mass.

* * * * *

UNITED STATES PATENT AND TRADEMARK OFFICE
CERTIFICATE OF CORRECTION

PATENT NO. : 6,802,513 B2  Page 1 of 1
DATED : October 12, 2004
INVENTOR(S) : H. Ranzau It is certified that error appears in the above-identified patent and that said Letters Patent is hereby corrected as shown below:

<u>Title page,</u>
Item [57], ABSTRACT,
Line 15, change "groove into contact with the base" to read -- groove into contact with the groove base --.

<u>Column 3,</u>
Line 44, after "These", insert -- ribs --.

Signed and Sealed this

Fifth Day of April, 2005

JON W. DUDAS
*Director of the United States Patent and Trademark Office*